United States Patent
Meyer

[15] 3,693,494
[45] Sept. 26, 1972

[54] FASTENER

[72] Inventor: Engelbert A. Meyer, Union Lake, Mich.

[73] Assignee: USM Corporation, Warren Division, Mount Clements, Mich.

[22] Filed: June 3, 1971

[21] Appl. No.: 149,690

[52] U.S. Cl. ................................................ 85/5 R
[51] Int. Cl. ........................................... F16b 19/00
[58] Field of Search ...... 85/502, 80, DIG. 2; 24/73 B, 24/73 MF, 73 P, 73 PM, 73 PF

[56] References Cited

UNITED STATES PATENTS

| 3,093,874 | 6/1963 | Rapata | 24/73 PM |
| 2,596,940 | 5/1952 | Poupitch | 85/5 R |
| 2,553,917 | 5/1951 | Hartman | 85/5 R |
| 3,574,899 | 4/1971 | Fisher | 24/73 PF |
| 2,698,472 | 1/1955 | Knohl | 24/73 MF |

Primary Examiner—Edward C. Allen
Attorney—Burton & Parker

[57] ABSTRACT

A one piece, resilient fastener, preferably constructed of a plastic material, having a head and a shank, the head being elongate and longitudinally bowed, and the shank being generally V-shaped with a relatively rigid leg secured to the concave surface of the head, and a relatively flexible opposite leg terminating in a free end portion adjacent the head, the shank legs being provided with laterally extending locking shoulders. The fastener is particularly adapted for securing two sheet-like members in face-to-face relationship, the shank of the fastener projecting through aligned apertures in the members, with its locking shoulders overlying the aperture marginal edges, and the opposite ends of the bowed head tensioned against the sheet surface spaced from the apertures to retain the sheets.

5 Claims, 4 Drawing Figures

PATENTED SEP 26 1972 3,693,494
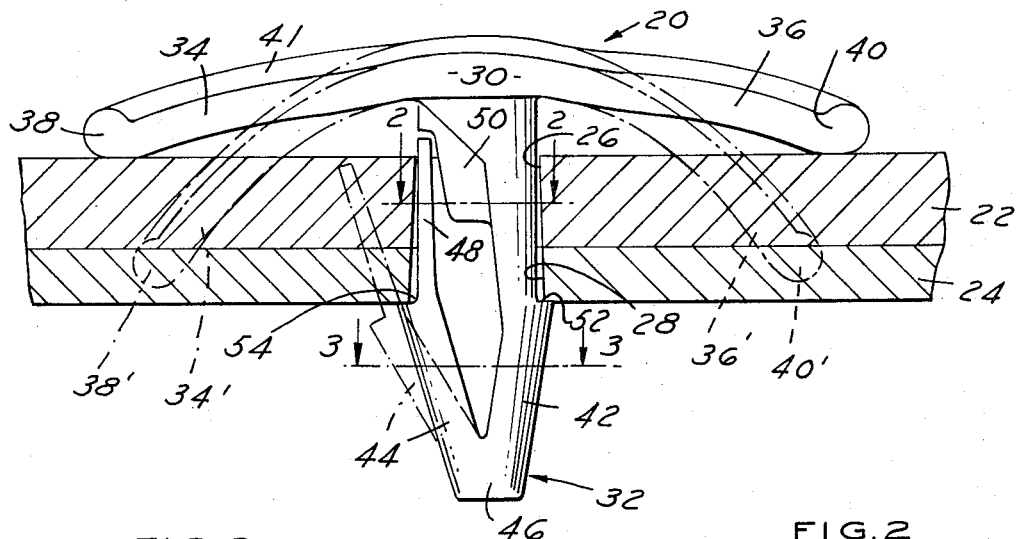
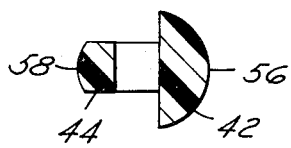
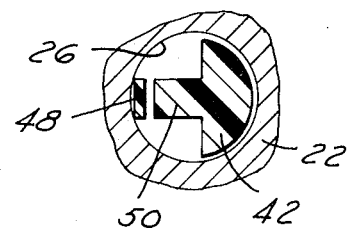
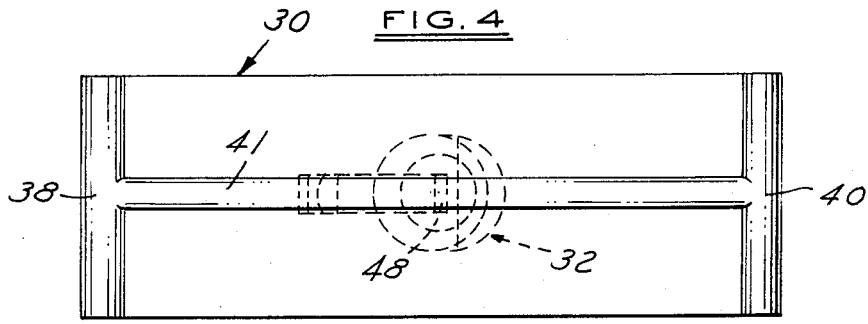
INVENTOR.
ENGELBERT A. MEYER
BY
Burton & Parker
ATTORNEYS

FASTENER

BACKGROUND OF THE INVENTION

The invention lies generally in the field of fasteners, and more particularly in the class of fasteners having a head and a shank, the head portion of the fastener overlying a surface of the member to which it is to be secured, and the shank portion extending through an aperture in the member and having locking means engaging the marginal edges of the aperture on the side of the member opposite the head portion. The specific fastener disclosed herein is intended for automotive use for securing a sheet-like member to a panel of the vehicle. For example, the fastener may be utilized to secure a sheet-like flexible guard to the vehicle walls forming the engine compartment to prevent stones, dirt and debris thrown up by the vehicle wheels from entering the engine compartment. The specific fastener disclosed may also be used to secure sheets of sound-deadening acoustical material to the vehicle body panels, such as is used to line the hoods or deck lids of the vehicles.

The instant fastener or clip employs a resilient bowed head and a generally V-shaped shank having locking shoulders, with one leg of the shank including a thin projecting portion terminating at its free end adjacent the head, with the opposite shank leg having stop means for limiting the inward movement of the projecting portion. The prior art is replete with clips or fasteners having a head and a shank wherein the shank projects through a panel aperture and is secured therein by some form of locking means on the shank. The prior art is exemplified by U.S. Pat. Nos. 2,692,414; 2,698,979; 3,015,869 and 3,373,463.

SUMMARY OF THE INVENTION

A one piece fastener preferably made out of plastic material for securing a sheet-like member to a panel where the member and the panel are provided with aligned apertures, the fastener including a resilient bowed head having opposite end portions engaging the sheet-like member on opposite sides of the aperture, and a generally V-shaped shank extending from the concave side of the head and projecting through the member and panel apertures, one leg of the shank being comparatively rigid while the other leg includes a thin flexible free end portion projecting through the apertures and terminating adjacent the head portion, and a laterally projecting locking shoulder on each of said shank legs overlying the marginal edges of the panel aperture on the side thereof opposite the fastener head.

The principal object of the invention is to provide a one piece fastener particularly adapted for securing a sheet-like member to a panel, the fastener including a bowed head overlying the sheet and a shank extending through apertures in the sheet and panel and having locking shoulders engageable with the aperture marginal edges to lock the fastener in place. The bowed head of the fastener is resiliently deformable, and exerts a compressive force against the sheet to firmly hold the sheet against the panel when the fastener is locked in place. In addition, the bowed head construction of the fastener permits identical fasteners to be used with sheets and panels of various thicknesses.

Other objects, advantages and meritorious features will more fully appear from the following description, claims and accompanying drawings, wherein:

FIG. 1 is a cross-sectional view taken through a sheet-like member and a panel, showing the fastener embodying the invention assembled within the aperture in side elevation, the free unassembled position of the fastener being shown in phantom outline;

FIG. 2 is a cross-section through the fastener shank taken on line 2—2 of FIG. 1;

FIG. 3 is a cross-section through the fastener shank taken on line 3—3 of FIG. 1; and FIG. 4 is a top elevation of the fastener shown in FIG. 4.

DESCRIPTION OF THE PREFERRED EMBODIMENT

Referring now more particularly to the drawing, there is shown in FIG. 1 a one piece fastener generally designated by the numeral 20 in operative position holding a sheet-like member 22 to a panel 24, the sheet and panel being provided with registering apertures 26 and 28 through which the fastener extends. The fastener comprises a head portion 30 and a shank portion 32, and is preferably made out of a tough but resilient plastic material. The head portion of the fastener spans the aperture 26 in the sheet and is tensioned thereagainst, while the fastener shank projects through and beyond the aligned apertures 26 and 28 and locks against the marginal edge portions of the aperture 28 in the panel member 24. The specific fastener illustrated in the drawing is utilized to secure a flexible sheet-like member 22, made out of rubber or the like to a metal panel member 24 of an automobile vehicle. However, it will be apparent to those skilled in the art that the fastener 20 could be utilized for securing virtually any members together which are provided with aligned apertures.

The head 30 of the fastener is resiliently deformable, and is arcuately bowed in cross-section, as clearly seen from FIG. 1, and exhibits oppositely extending arm portions 34 and 36 which terminate at their free ends in enlarged beads 38 and 40 respectively which bear against the surface of the sheet 22, thereby firmly gripping the sheet and urging it into intimate contact with the panel 24. As shown in phantom outline in FIG. 1, the fastener 20 is constructed with its arm portions 34 and 36 severely bowed as shown at 34' and 36', the outer end portions 38' and 40' projecting toward the free end of the shank 32, and these arm portions are resiliently deformed upon assembly of the fastener in the apertures 26 and 28.

The shank portion 32 of the fastener is essentially V-shaped and includes opposed legs 42 and 44 joined together at the bight of the V as shown at 46 in FIG. 1. Shank leg 42 is relatively rigid, and is integrally connected to the head 30 at its upper end, while leg 44 is resiliently deformable to permit insertion of the shank through the apertures 26 and 28. In its free, unassembled position, leg 44 extends generally away from leg 42 as shown at 44' in FIG. 1.

Shank leg 44 has a relatively thick lower end portion adjacent the shank bight 46, and a relatively thin projecting portion 48 which projects through and beyond the sheet aperture 26, and terminates adjacent the fastener head 30. Shank leg 42 adjacent its upper end is provided with a laterally projecting stop portion 50 which extends adjacent the opposite leg portion 48 adjacent the free end thereof and limits inward flexing of the leg portion 48.

Each of the shank legs 42 and 44 is provided with a transverse shoulder or abutment shown in FIG. 1 at 52 and 54 respectively, which shoulders lock against the marginal edges of the panel aperture 28 at substantially diametrically opposite points to securely retain the fastener. As can be most clearly seen from an examination of FIG. 3, the outer surfaces of shank legs 42 and 44 from the locking shoulders 52 and 54 to the shank bight 46, are arcuately shaped, as shown at 56 and 58, thereby facilitating insertion of the fastener through the circular apertures 26 and 28 in the sheet and panel. Referring to FIG. 4, it can be seen that the fastener head 30 is an elongate rectangle, with the reinforcing beads 38 and 40 extending transversely along opposite ends of the head, and a head reinforcing bead 41 extends substantially longitudinally centrally of the head 30 between the end beads 38 and 40. The longitudinal bead 41 serves to strengthen the head 30 and rigidify it somewhat to insure that the sheet 22 is firmly tensioned against the panel 24 by engagement of the beads 38 and 40 thereagainst when the fastener is assembled within the apertures.

The fastener 20 is preferably made of a plastic material, examples being Celcon M-90, a registered trademark of Celanese Corp. of America for its thermoplastic consisting essentially of ethyl cellulose and plasticizers; or G.P. Polypropylene. Other materials possessing similar characteristics may also be used.

In order to insert the fastener 20 within the apertures 26 and 28 to secure the sheet 22 to the panel 24, it is only necessary to insert the bight portion 46 of the fastener shank into the sheet aperture, and exert pressure against the central portion of the head 30, thereby resiliently deforming shank leg 44 to permit entrance through the apertures until the locking shoulders 52 and 54 are clear of the panel 24, whereat the shank legs spring outwardly and the shoulders lock against the marginal edges of the panel aperture. During insertion of the shank, the fastener head 30 is being deformed from the shape shown in phantom outline to the shape shown in solid outline in FIG. 1, thereby providing a secure assembly, with the sheet 22 firmly tensioned against the panel 24. The construction of the fastener head 30 will permit the fastener to be used with various thicknesses of sheet material 22 ranging from a very thin sheet to a sheet of appreciable thickness as shown in FIG. 1.

What is claimed is:

1. A unitary fastener for connecting together parts of varying thickness having aligned apertures, comprising a resilient substantially bowed head and a generally V-shaped shank defined by a pair of legs integrally resiliently connected together at the apex of the V shape with the upper end of one of the legs integral with the concave side of the bowed head generally centrally thereof and with the other leg being a free leg and with the V-shaped shank projectable apex-end-first through the aligned apertures of the parts to be connected, said free leg extending from the apex of the V shape toward the concave side of the head and terminating in a free end portion disposed closely threadadjacent, a single pair of catch shoulders on the lateral exterior of the legs facing the concave side of the bowed head and spaced from the central portion thereof a distance sufficient to accommodate the maximum combined thickness of the parts to be connected, said catch shoulders lying in a plane extending transversely of the shank and disposed closely adjacent the free marginal edges of said bowed head, said free end portion of the free leg comprising a resilient extension projecting from the catch shoulder of such leg toward the bowed head and lying substantially completely within the concavity of the head, one of said legs adjacent the bowed head and within the concavity thereof having a stop opposing the other leg to normally limit movement of the legs toward each other, and said resilient extension being bendable between said stop and the catch portion of the free leg to allow squeezing of the free leg toward the other leg beyond the normal limit imposed by said stop during insertion of the shank through the apertures of the parts to be connected to dispose the catch shoulders on the opposite sides of the parts from the bowed head.

2. A unitary fastener as defined in claim 1 characterized in that the laterally outwardly facing surfaces of said shank between the apex of the V-shape and said catch shoulders are convex to facilitate insertion of the fastener shank through the apertures in the parts to be connected.

3. A unitary fastener as defined in claim 1 characterized in that said stop means comprises a laterally extending portion on said one leg projecting into confronting relation with said resilient end portion of said free leg.

4. A unitary fastener as defined in claim 1 characterized in that said bowed head is generally rectangular, and is provided with enlarged reinforcing beads extending along its opposite ends for bearing against one of the parts to be connected.

5. A unitary fastener as defined in claim 4 characterized in that said rectangular bowed head is provided with a third reinforcing bead extending substantially along its longitudinal axis between said end reinforcing beads.

* * * * *